US012771258B2

(12) United States Patent
Ng et al.

(10) Patent No.: US 12,771,258 B2
(45) Date of Patent: Oct. 20, 2026

(54) SYNCHRONOUS RECTIFIER CONTROL FOR SECONDARY SIDE TURN-ON PROTECTION

(71) Applicant: Infineon Technologies Austria AG, Villach (AT)

(72) Inventors: Wee Tar Richard Ng, Singapore (SG); Andrey Malinin, Fort Collins, CO (US)

(73) Assignee: Infineon Technologies Austria AG, Villach (AT)

( * ) Notice: Subject to any disclaimer, the term of this patent is extended or adjusted under 35 U.S.C. 154(b) by 258 days.

(21) Appl. No.: 18/619,904

(22) Filed: Mar. 28, 2024

(65) Prior Publication Data

US 2025/0309774 A1 Oct. 2, 2025

(51) Int. Cl.
*H02M 3/335* (2006.01)
*H02M 1/38* (2007.01)

(52) U.S. Cl.
CPC ......... *H02M 3/33592* (2013.01); *H02M 1/38* (2013.01)

(58) Field of Classification Search
CPC ............ H02M 3/22; H02M 1/08; H02M 1/36; H02M 3/24; H02M 3/325; H02M 3/335; H02M 3/28; H02M 3/01; H02M 3/33569; H02M 3/33507; H02M 2007/4815; H02M 2007/4818; H02M 1/083; H02M 3/33538; H02M 3/33546; H02M 3/33515; H02M 3/33576; H02M 3/33592; H02M 3/33553; H02M 3/33523; H02M 3/33561; H02M 3/155; H02M 3/1582; H02M 1/4233; H02M 1/12; H02M 3/07; H02M 7/219; H02M 7/4815; H02M 1/0048; H02M 7/4818; H02M 7/4826; H02M 7/4833; H02M 3/33573; Y02B 70/1491
See application file for complete search history.

(56) References Cited

U.S. PATENT DOCUMENTS

| | | | | |
|---|---|---|---|---|
| 10,122,287 | B2 * | 11/2018 | Leong | H02M 3/33592 |
| 12,009,754 | B2 * | 6/2024 | Hari | H02M 1/088 |
| 2002/0001204 | A1 | 1/2002 | Lentini et al. | |
| 2002/0141209 | A1 | 10/2002 | Bridge | |
| 2009/0003019 | A1 | 1/2009 | Yang | |
| 2014/0112030 | A1 | 4/2014 | Fahlenkamp et al. | |
| 2018/0034377 | A1 | 2/2018 | Cao et al. | |
| 2018/0248488 | A1 | 8/2018 | Cao et al. | |
| 2024/0322693 | A1 * | 9/2024 | Rubinic | H02M 1/342 |

* cited by examiner

*Primary Examiner* — Jeffrey A Gblende
(74) *Attorney, Agent, or Firm* — Armis IP Law, LLC

(57) ABSTRACT

A controller associated with a power supply determines a first ratio value. The first ratio value may be a ratio of a second time duration with respect to a first time duration, where the second time duration is a measured time duration associated with demagnetizing of a transformer in a first control cycle. The first time duration may be a measured time duration of activating a first switch in the first control cycle, where activation of the first switch operative to control a magnitude of primary current through a primary winding of the transformer. For second control cycle occurring subsequent to the first control cycle, the controller calculates an ON-time duration for activating the second switch based on the determined first ratio value.

23 Claims, 15 Drawing Sheets

SYNCHRONOUS RECTIFIER CONTROL FOR SECONDARY SIDE TURN-ON PROTECTION

BACKGROUND

According to conventional techniques, there are predominantly 2 types of Synchronous Rectification (SR) Techniques for power conversion. Such power converter techniques include a direct sensing method and voltage balance method. Regardless of which method is used for SR operation, it is desirable to turn OFF a respective SR Power FET (Field Effect Transistor or MOSFET such as Metal Oxide Semiconductor Field Effect Transistor) on a secondary side of the conventional power supply as soon as demagnetization in a respective secondary winding is detected as being complete.

As a more specific example, in a SR switch ON/OFF phase, when the SR switch in a conventional power converter is turned ON, the difference in voltage between the drain node and the source of the SR switch is based on the voltage drop caused by RDS (ON) instead of the voltage drop associated with a forward biased body diode associated with the SR switch. The SR switch (MOSFET) internal resistance becomes a current sense resistor and its voltage drop becomes directly proportional to the current passing through the SR switch.

BRIEF DESCRIPTION

One way to detect occurrence of final demagnetization of a secondary winding of a synchronous rectifier power supply for turning off a respective SR switch after demagnetization of a secondary winding is to monitor a magnitude of voltage across the respective SR switch (such as from source node to drain node) of the secondary side and compare it to a threshold value. For example, when the magnitude of the voltage across the drain and the source node of the SR switch is measured as being zero volts, the switch may be deactivated without stressing or damaging the SR switch. As previously discussed, activation of the SR switch to an ON state during a condition such as when the anti-parallel diode associated with the switch is also in a forward biased mode reduces the respective resistance of the switch.

This disclosure includes the observation that it is difficult to precisely measure a respective voltage across an SR switch such as between a respective drain node and a source node to control turnoff of an SR switch. Techniques as discussed herein include novel ways of providing improved control of a respective SR switch (a.k.a., synchronous rectifier switch) to support demagnetization of the winding without having to precisely measure the voltage across the drain node and the source node of the SR switch.

More specifically, an apparatus as discussed herein includes a controller. The controller is operative to: for a first control cycle N of multiple control cycles: i) determine a first time duration of an ON-time of activating a first switch, the first switch operative to control a magnitude of primary current through a primary winding of a transformer, and ii) measure a second time duration associated with demagnetization of the transformer subsequent to activation of the first switch for the first time duration; for a second control cycle N+1 of the multiple control cycles subsequent to the first control cycle N: i) determine a third time duration of an ON-time of activating the first switch in the second control cycle, and ii) calculate a fourth time duration in which to control an ON-time of a second switch based on a combination of the first time duration, the second time duration, and the third time duration; and in the second control cycle N+1, control the ON-time of the second switch based on the fourth time duration.

Accordingly, examples herein include a controller operative to determine how to control operation of a respective SR switch (second switch) coupled to a secondary winding of the transformer based on calculating the fourth time duration for an N+1 control cycle based upon time duration measurements of controlling the first switch and the second switch in a previous control cycle N.

In accordance with further examples, the controller can be configured to control the second switch to the ON-state for the fourth time duration instead of having to rely on only forward biasing of a diode associated with the second switch to cause demagnetization of the secondary winding of the transformer.

In one example, the controller is further operative to calculate the fourth time duration based on a time duration value, the time duration value derived via: i) a ratio of the third time duration with respect to the first time duration, and ii) multiplication of the ratio and the second time duration.

In accordance with further examples as discussed herein, the controller can be configured to calculate the fourth time duration based on reducing a magnitude of the time duration value.

Still further, as discussed herein, the second switch may be configured to control the flow of secondary current through a secondary winding of the transformer, wherein the secondary winding is magnetically coupled to the primary winding.

In accordance with another example, the second switch as discussed herein may be set to an OFF-state during the second time duration; the control cycle N may be a first cycle of the multiple control cycles; the second switch may be a field effect transistor including an anti-parallel diode disposed between a drain node of the second switch and a source node of the second switch; and the secondary current may flow through the anti-parallel diode during the first cycle N to demagnetize the transformer.

In yet a further example, the controller can be configured to determine the first time duration via monitoring a voltage across a source node of the second switch and a drain node of the second switch.

In accordance with another example as discussed herein, the controller can be configured to measure the second time duration via monitoring a voltage across a source node of the second switch and a drain node of the second switch.

In another example, the controller may be configured to calculate the fourth time duration in which to control the ON-time of the second switch in the N+1 control cycle subsequent to expiration of the third time duration.

As a further example, the controller can be configured to measure a fifth time duration in the second control cycle, the fifth time duration indicating an amount of time required to demagnetize the transformer subsequent to activation of the first switch for the third time duration in the second control cycle N+1. Activation of the second switch for the fourth time duration in the second control cycle N+1 at least partially demagnetizes the transformer during the fifth time duration (which is may be mostly concurrent with the fourth time duration). Flow of the secondary current through an anti-parallel diode associated with (such as internal or external) the second switch at least partially demagnetizes the transformer during the fifth time duration.

In a further example, the second time duration may be measured via monitoring a magnitude of the secondary current through the secondary winding; the magnitude of the secondary current may be monitored via a voltage across the second switch.

Still further, as discussed herein, the ON-time activation of the second switch in the second duration of the first control cycle N and the fourth duration of the second control cycle N+1 may control the secondary current through the secondary winding, the ON-time activation of the second switch may be operative to demagnetize the transformer.

In accordance with another example, the apparatus as discussed herein can be configured to include a controller associated with a power converter. The controller can be configured to: determine a first ratio value, the first ratio value being a ratio of a second time duration with respect to a first time duration, the first time duration being a measured time duration of activating a first switch in a first control cycle, the second time duration being a measured time duration associated with activation of the first switch in a second control cycle, activation of the first switch operative to control a magnitude of primary current through a primary winding of a transformer; and for the second control cycle which occurs subsequent to the first control cycle, calculate an ON-time duration for activating a second switch based on the determined first ratio value.

Yet further, the controller can be configured to: measure an ON-time duration of activating the second switch in the first control cycle, the second switch coupled to receive current from a secondary winding of the transformer, the secondary winding magnetically coupled to the primary winding; and calculate the ON-time duration for activating the second switch for the second control cycle via generation of a time duration value, the time duration value generated via multiplying the measured ON-time duration of activating the second switch in the first control cycle by the determined first ratio value.

Still further, the controller can be configured to calculate the ON-time duration for activating the second switch in the second control cycle by reducing the time duration value by a predetermined time duration. In accordance with further examples as discussed herein, the reduction of the time duration by the predetermined time duration ensures that the calculated ON-time duration for activating the second switch in the second control cycle is less than a time to demagnetize the transformer in the second control cycle subsequent to deactivation of the first switch in the second control cycle.

Further examples herein include configuration of the controller to measure a third time duration in the second control cycle, the third time duration indicating an amount of time that was required to demagnetize the transformer subsequent to deactivation of the first switch in the second control cycle; and wherein the measured third time duration is at least partially concurrent with activation of the second switch for the calculated ON-time duration in the second control cycle.

As further discussed herein, the controller can be configured to activate the second switch in the second control cycle based on the calculated ON-time duration, the second switch coupled to receive current from a secondary winding of the transformer, the secondary winding magnetically coupled to the primary winding; and wherein the activation of the second switch in the second control cycle prevents the magnitude of current through the secondary winding from rising above a threshold level.

Yet another example as discussed herein includes a method comprising: determining a first ratio value, the first ratio value being a ratio of a second time duration with respect to a first time duration, the first time duration being a measured time duration of activating a first switch in a first control cycle, the second time duration being a measured time duration associated with activation of the first switch in a second control cycle, activation of the first switch operative to control a magnitude of primary current through a primary winding of a transformer; and for the second control cycle occurring subsequent to the first control cycle, calculating an ON-time duration for activating a second switch based on the determined first ratio value.

The method may further include calculating the ON-time duration for activating the second switch for the second control cycle via generation of a time duration value, the time duration value generated via multiplying the measured ON-time duration of activating the second switch in the first control cycle by the determined first ratio value.

Still further, the method as discussed herein can include calculating the ON-time duration for activating the second switch in the second control cycle by reducing the time duration value by a predetermined time duration to produce the calculated ON-time duration. The reduction of the time duration value by the predetermined time duration ensures that the calculated ON-time duration for activating the second switch in the second control cycle is less than a time to demagnetize the transformer in the second control cycle subsequent to deactivation of the first switch in the second control cycle.

In yet further examples, the method as discussed herein includes measuring a third time duration in the second control cycle, the third time duration indicating an amount of time that was required to demagnetize the transformer subsequent to deactivation of the first switch in the second control cycle; and wherein the measured third time duration is at least partially concurrent with activation of the second switch for the calculated ON-time duration in the second control cycle.

Note that in addition to potentially being implemented as an analog controller and corresponding analog circuitry/components as described herein, examples herein include implementing the described circuitry via digital controller/monitor implementations. More specifically, note that any of the resources as discussed herein can include digital circuitry such as one or more computerized devices, apparatus, hardware, etc., that execute and/or support any or all of the method operations disclosed herein. In other words, one or more computerized devices or processors can be programmed and/or configured to operate as explained herein to carry out the different examples as described herein.

Yet other examples herein include software programs to perform the steps and/or operations summarized above and disclosed in detail below. One such example comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, examples herein are directed to a method, system, computer program product, etc., that supports operations as discussed herein.

One example includes a computer readable storage medium and/or system having instructions stored thereon to facilitate generation of an output voltage from a respective power supply. The instructions, when executed by computer processor hardware, cause the computer processor hardware to: determine a first ratio value, the first ratio value being a ratio of a second time duration with respect to a first time duration, the second time duration being a measured time duration associated with demagnetizing of a transformer in a first control cycle, the first time duration being a measured time duration of activating a first switch in the first control cycle, activation of the first switch operative to control a magnitude of primary current through a primary winding of the transformer; and for a second control cycle occurring subsequent to the first control cycle, calculate an ON-time duration for activating the second switch based on the determined first ratio value.

The ordering of the operations above has been added for clarity sake. Note that any of the processing steps as discussed herein can be performed in any suitable order.

Other examples of the present disclosure include software programs and/or respective hardware to perform any of the method example steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

Note further that although examples as discussed herein are applicable to controlling operation of a power supply to generate an output voltage, the concepts disclosed herein may be advantageously applied to any other suitable voltage converter topologies.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of examples herein (BRIEF DESCRIPTION OF EXAMPLES) purposefully does not specify every example and/or incrementally novel aspect of the present disclosure or claimed invention (s). Instead, this brief description only presents general examples and corresponding points of novelty over conventional techniques. For additional details and/or possible perspectives (permutations) of the invention(s), the reader is directed to the Detailed Description section (which is a summary of examples) and corresponding figures of the present disclosure as further discussed below.

Figure 1:
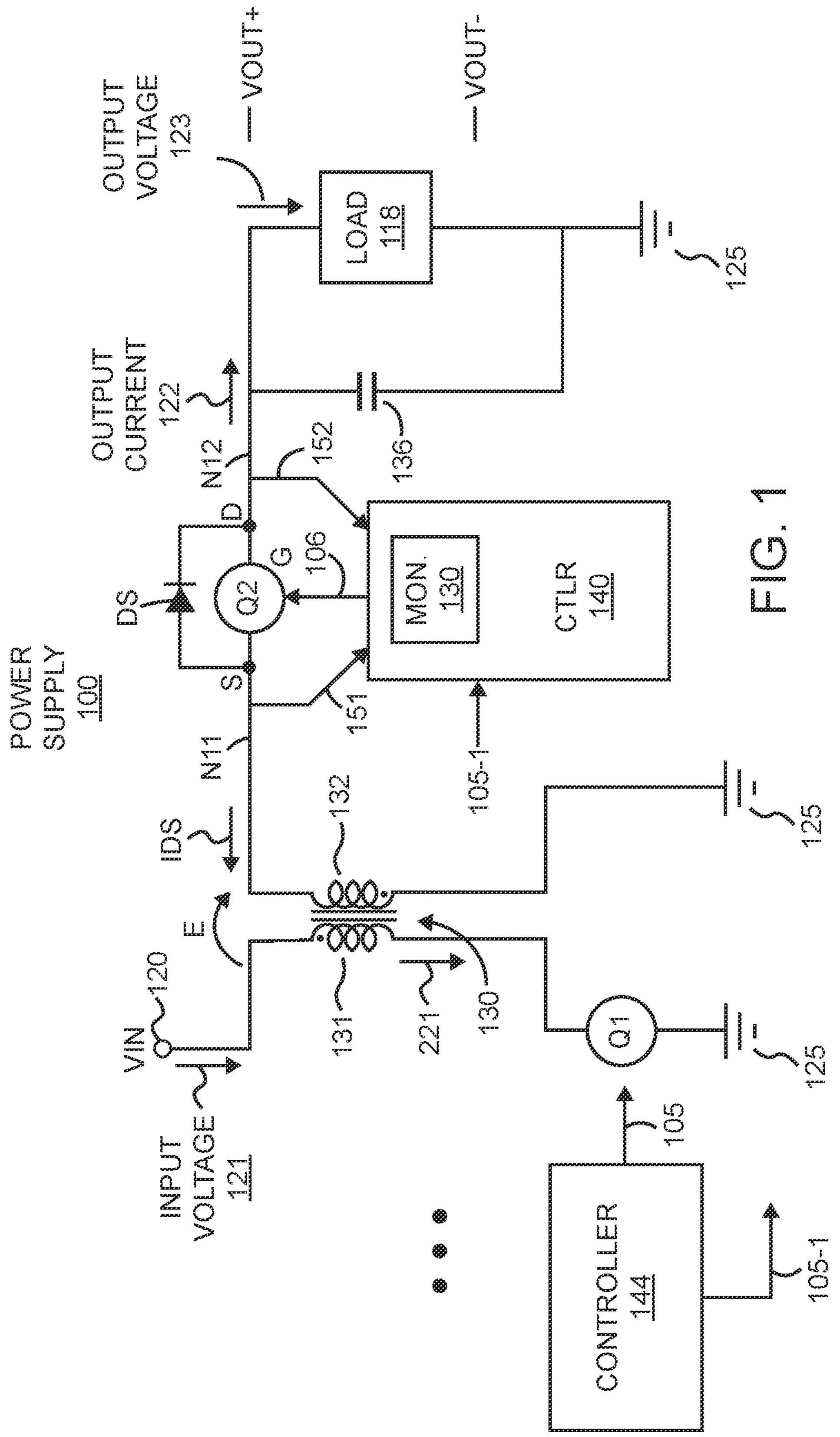
FIG. 1 is an example general diagram illustrating a power supply and corresponding switch control to convert an input voltage into an output voltage as discussed herein.

The foregoing and other objects, features, and advantages of examples herein will be apparent from the following more particular description herein, as illustrated in the accompanying drawings in which like reference characters refer to the same parts throughout the different views. The drawings are not necessarily to scale, with emphasis instead being placed upon illustrating the examples, principles, concepts, etc.

DETAILED DESCRIPTION

According to one example as discussed herein, an SR switch of the secondary side of a power converter supports demagnetization of a respective transformer via current from a secondary winding of the transformer through the SR switch and/or an anti-parallel diode associated with the SR switch. Presence of the antiparallel diode (such as the inherent diode in the SR switch itself or a corresponding supplemental diode connected between a source node and a drain node of the SR switch) itself may become forward bias and help to demagnetize the secondary winding of the transformer. As further discussed herein, instead of only relying on a forward bias operation of the anti-parallel diode to support demagnetization, it may be desirable to actively set the SR switch to an on state because the corresponding resistance RDS between the source node and the drain node of the SR switch in the on state is less than the resistance associated with the forward biasing of the anti-parallel diode. This disclosure includes the observation that it is undesirable to activate the respective SR switch for a longer time duration than a condition in which the voltage between the drain node in the source node becomes greater than zero. The techniques as discussed herein include preventing activation of the respective SR switch during conditions in which the voltage between the drain node and the source node is greater than zero. As shown and as further discuss herein, this may include deactivation of the respective SR switch to an off state prior to a condition in which the voltage between the drain node and the source node increases to around or above zero volts as discussed herein.

Now, more specifically, FIG. 1 is an example general diagram illustrating a power supply according to examples herein.

As shown in this example, power supply 100 (such as an apparatus, electronic device, etc.) includes transformer 130, switch Q1, and controller 144 disposed on the primary side of the power supply 100. The secondary side of the power supply 100 includes switch Q2 (a.k.a., an SR switch or other suitable entity), controller 140, monitor 141, output capacitor 136, and load 118.

Thus, transformer 130 in this example includes the primary winding 131 and the secondary winding 132. The secondary winding 132 is magnetically coupled to the primary winding 131.

In one example, the primary winding 131 and the switch Q1 are coupled in series between the input voltage source 120 supplying the input voltage 121 and a ground reference voltage 125. The controller 144 can be configured to control operation of the switch Q1 via generation of the control signal 105. Controlled operation of the switch Q1 determines how much current 221 flows through the respective winding 131. If desired, the controller 140 generates corresponding signal 105-1 indicating a state of controlling the respective switch Q1. Signal 105-1 can be conveyed to the controller 140 for monitoring.

As further shown, and as previously discussed, the secondary side of the power supply 100 includes the controller 140, secondary winding 132, and the switch Q2. The secondary winding 132 and switch Q2 are connected in series between the ground reference voltage 125 and the node N12 to produce a respective output voltage 123 and/or overcurrent 122 that powers the load 118. More specifically, the secondary winding 132 is connected between the reference voltage 125 and the node N11; the switch Q2 and corresponding diode DS are connected between the node N11 and the node N12.

In general, to convert the input voltage 121 into the respective output voltage 123, for each respective control cycle of multiple control cycles, the controller 144 activates the switch Q1 for a first portion of the respective control cycle; the controller 144 deactivates the switch Q1 to an off state for a second portion and a third portion of the respective control cycle. The controller 140 and corresponding monitor 141 can be configured to monitor any suitable parameter associated with the power supply 100 to activate the switch Q2 to an on state in the second portion of the respective control cycle. As further discussed herein, the controller 140 deactivates the switch Q2 to an off state for the third portion of the respective control cycle.

This repeated operation of controlling the respective switch Q1 and the switch Q2 in each of the respective control cycles results in conversion of the input voltage 121 into the output voltage 123 and corresponding output current 122.

In other words, during operation, activation of the switch Q1 via a respective controller 144 on the primary side (left of the winding 131) causes a flow of current from the input voltage source (Vin) through the primary winding 131 and the switch Q1. Based upon the flow of current through the primary winding 131 during the first portion of respective control cycle, the primary winding 121 stores magnetic energy E in the transformer 130.

During a second portion of the control cycle, the controller 140 activates the switch Q2. Activation of the switch Q2 as discussed herein causes the secondary winding 122 to efficiently convert the stored energy E received from the primary winding 131 into the output voltage 123 and corresponding output current 122 that powers the load 118.

In one example, if the switch Q2 were not activated during the second portion of the respective control cycle, current 122 (a.k.a., IDS) flows through a so-called anti-parallel diode (approximately a 0.7 volts drop) associated the switch Q2 (such as one or more of the inherent diode D2 associated with the switch Q2 or the supplemental diode DS associated with the switch Q2) or both.

The supplemental diode DS may extend between source [anode of diode DS coupled to the source node of the switch Q2] and drain [cathode of diode DS coupled to the drain node of the switch Q2]). Note that the anti-parallel diode function (such as associated with the diode D2 or the inherent diode associated with the switch Q2) conveys current 122 received from the secondary winding 132 to the output node N12. Rather than rely solely on the anti-parallel diode function provided by the diode D2 and/or the supplemental diode DS to convey the corresponding current received from the secondary winding 132 to the output node N12, activation of the switch S2 (to an on state via control signal 106) during the second portion of the respective control cycle as discussed herein provides a lower impedance path than mere presence of the inherent diode of the switch Q2 or the supplemental diode DS, providing higher conversion efficiency.

As further discussed herein, it is desirable to activate the switch Q2 during the second portion of the respective control cycle when the voltage VDS (voltage between the source node and the drain node of the switch Q2) is less than or equal to 0 volts instead of relying on the inherent diode D2 of switch Q2 and/or the supplemental diode DS to convey such current from the secondary winding 132 to the output node N12. It is undesirable to activate the switch Q2 during the second portion of the respective control cycle when the voltage VDS becomes greater than 0 volts.

Accordingly, examples as discussed herein are useful over conventional techniques. For example, conventional techniques are prone to improper activation of the switch Q2 (such as SR switch) because the monitored voltage VDS of the switch Q2 repeatedly crosses a respective threshold value such as 0 volts and may be difficult to precisely measure. In contrast to conventional techniques, examples as further discussed herein include monitor 130 (associate with the controller 140) that, based on determination of time durations and/or one or more ratio values associated with time durations in one or more previous cycles, controls activation of the switch Q2 to an ON-state in the respective second portion of a switching cycle.

Figure 2:
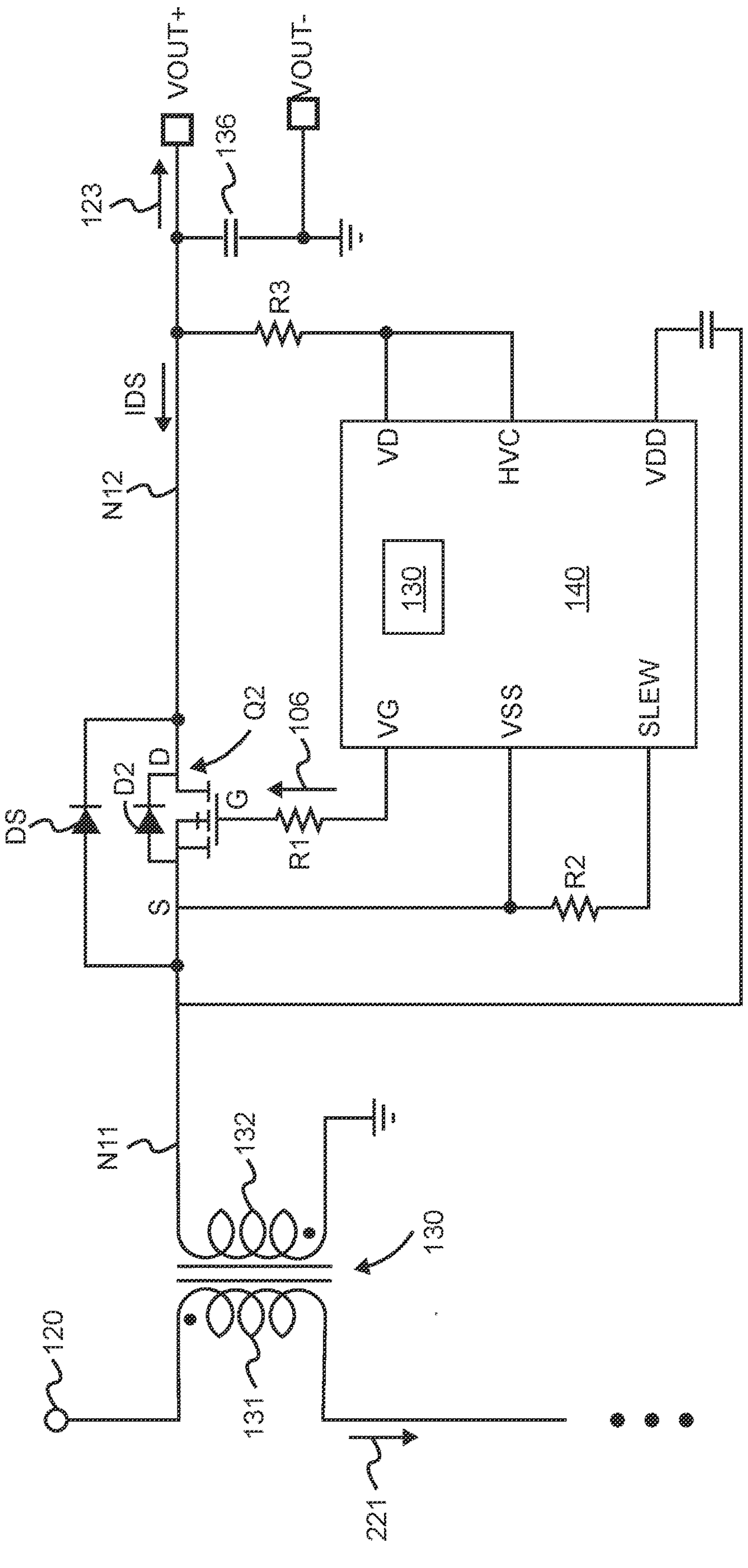
FIG. 2 is a more detailed example diagram illustrating a power supply and switch control as discussed herein.

FIG. 2 is a more detailed example diagram illustrating a power supply according to examples herein.

In this example, the controller 140 and corresponding monitor circuit 130 is implemented via a respective semiconductor chip including multiple pins such as pin VG, pin VSS, pin SLEW, pin VD, pin HVC, and pin VDD.

As shown in FIG. 2, the pin VG is operative to output the control signal 106 through the resistor R1 to the output the control signal 106 to control the state of the switch Q2 on and off; the pin VSS is connected to the source node of the switch Q2 to monitor the voltage at node N11 (source node of the switch Q2); pin SLEW is connected to the node N11 via resistor R2; pin VD is connected to the drain node of the switch Q2 to monitor the voltage at node N12 (drain node of the switch Q2) through the resistor R3; pin HVC is connected to the node N12 through the resistor R3 as well; and pin VDD is connected to the node N11 through the capacitor C1.

Figure 3:
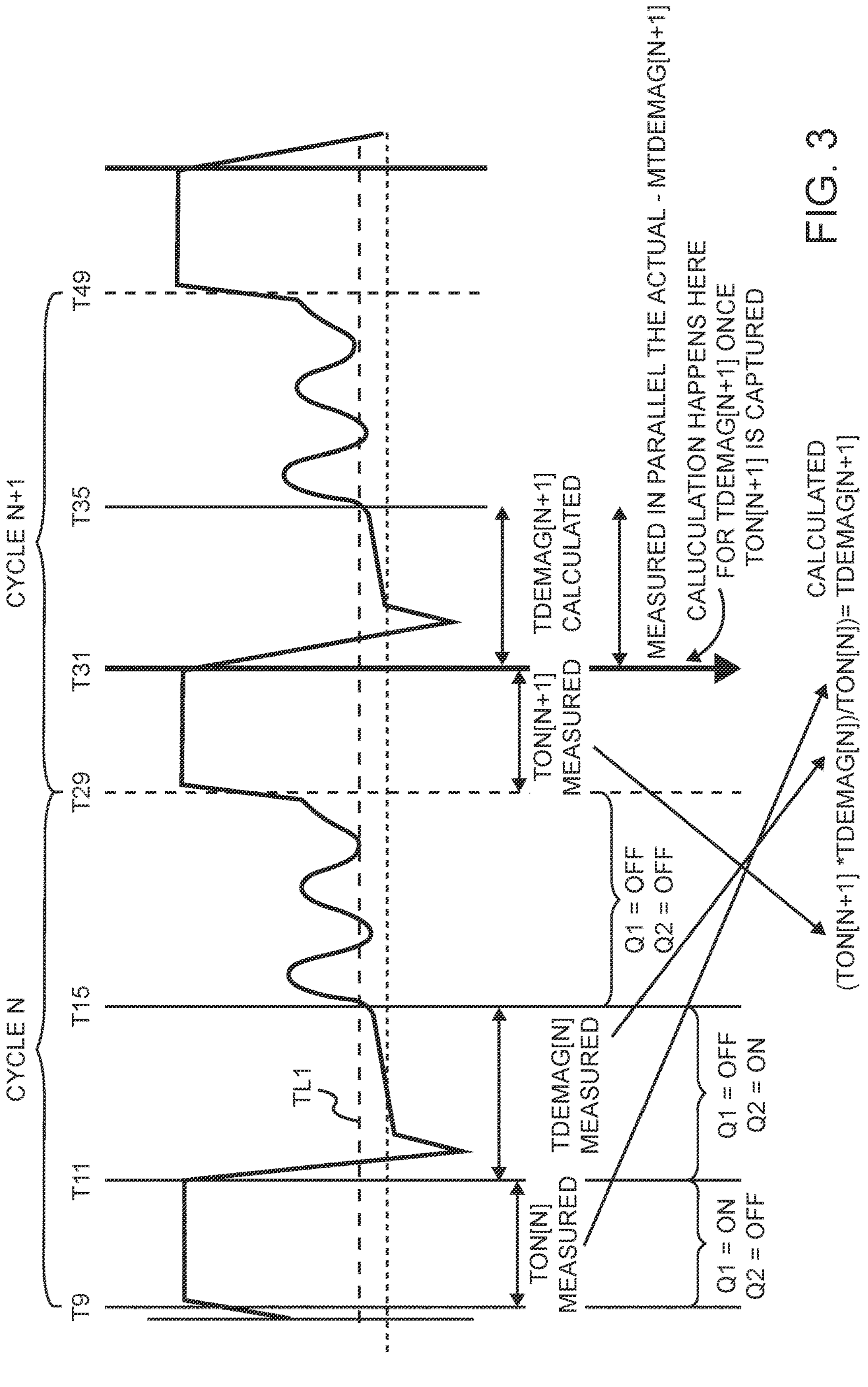
FIG. 3 is an example timing diagram illustrating multiple cycles of controlling activation of a respective SR switch as discussed herein.

FIG. 3 is an example diagram illustrating control of a respective SR switch to support demagnetization of respective secondary winding as discussed herein.

In this example, for a first control cycle N of multiple control cycles, the controller 140: i) determines (such as measures) a first time duration Ton[N] of an ON-time of activating a first switch Q1 as the difference between time T9 and time T11. The first time duration can be measured in any suitable manner. As previously discussed, the first switch Q1 is operative to control a magnitude of primary current 221 through a primary winding 131 of the transformer 130.

Further in this example, the controller 140 measures a second time duration TDEMAG[N] associated with demagnetization of the transformer 130 (such as between T11 and T15) and corresponding windings subsequent to activation of the first switch Q1 for the first time duration between time T9 and time T11.

For a second control cycle N+1 of the multiple control cycles subsequent to the first control cycle N, the controller 140: i) determines (measures) a third time duration Ton[N+1] of an ON-time of activating the first switch Q1 in the second control cycle N+1. The third time duration can be determined in any suitable manner as previously discussed.

The controller 140 then calculates a fourth time duration cTDEMAG[N+1] in which to control an ON-time of the second switch Q2 in control cycle N+1 based on a combination of the first time duration, the second time duration, and the third time duration. For example, the controller 140 can be configured to generate the calculated on time of switch Q2 for the fourth time duration as follows:

$$cTDEMAG[N+1]=(Ton[N+1]/Ton[N])*TDEMAG[N],$$

where (Ton[N+1]/Ton[N]) is a ratio value.

In the second control cycle N+1, such as between time T31 and time T35, the controller 140 controls the ON-time of the second switch Q2 based on the calculated fourth time duration cTDEMAG[N+1].

Accordingly, the controller 140 may be configured to calculate the fourth time duration cTDEMAG[N+1] for controlling the respective switch Q2 to an ON-state in the control cycle N+1 based on a time duration value such as based on: i) a ratio of the third time duration with respect to the first time duration (a.k.a. ratio value), and ii) multiplication of the ratio value and the second time duration.

Figure 5:
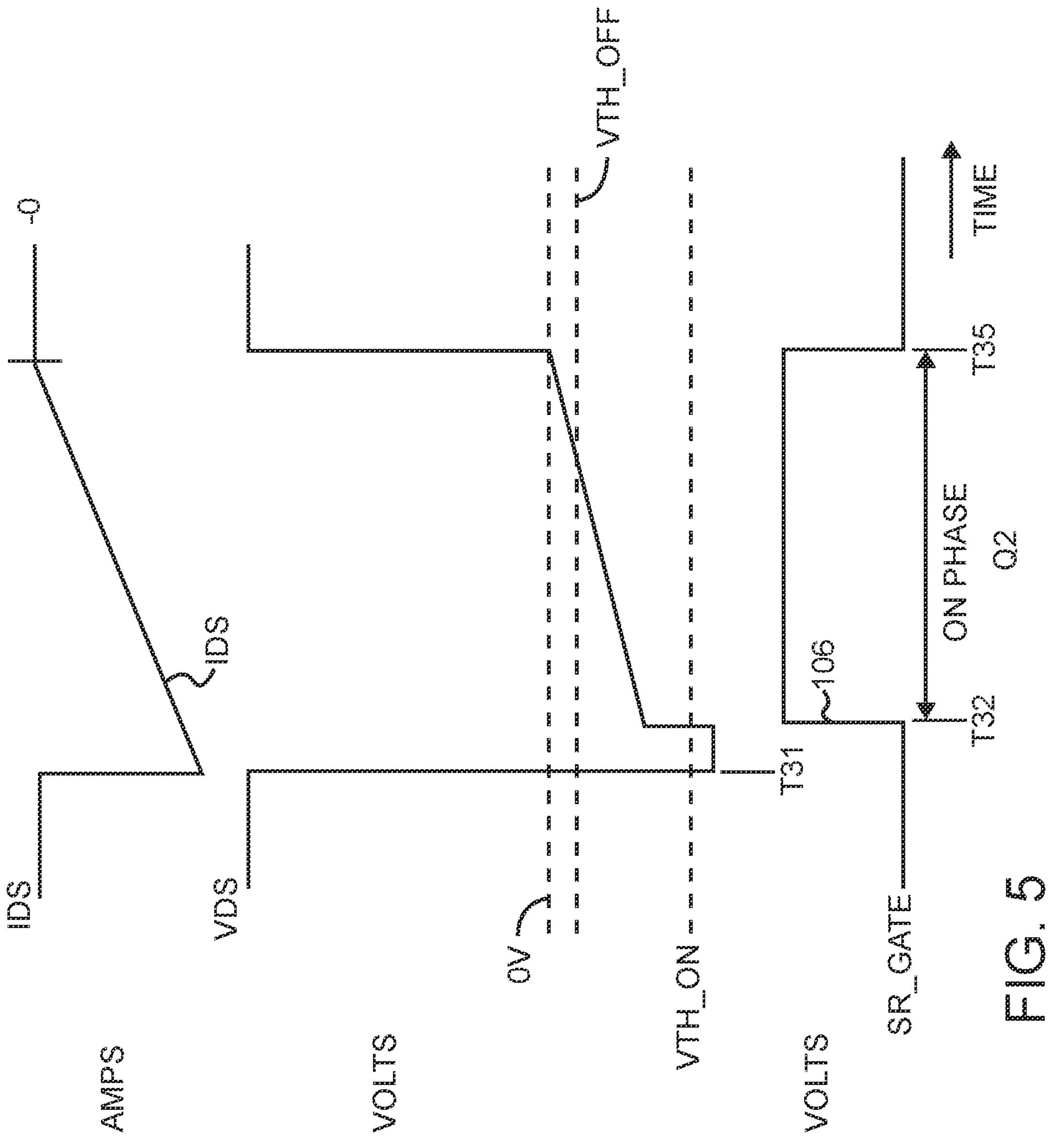
FIG. 5 is an example diagram illustrating control of a respective SR switch to support demagnetization of respective secondary winding as discussed herein.
Figure 6:
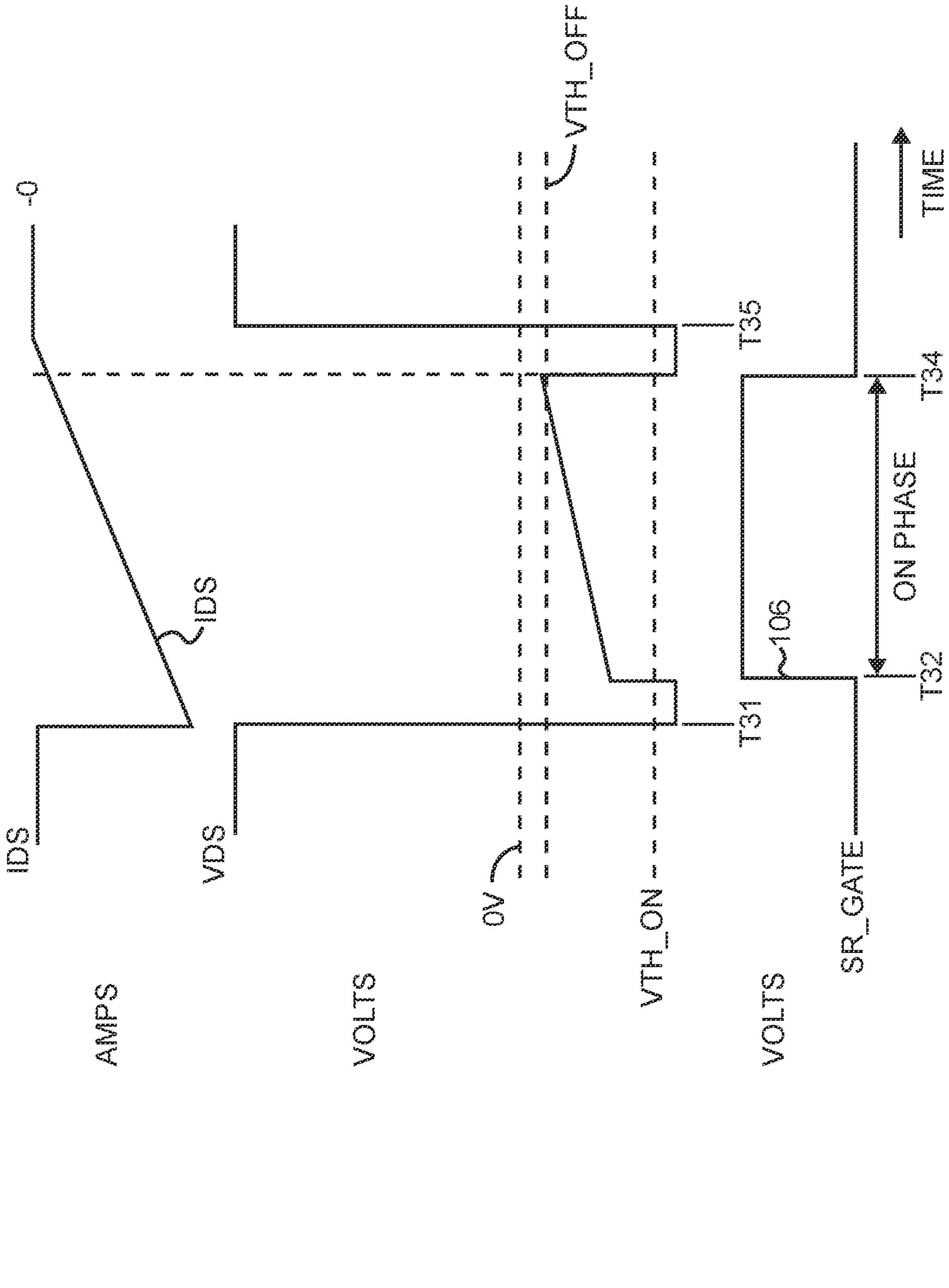
FIG. 6 is an example diagram illustrating control of a respective SR switch for a shortened time duration to support demagnetization of respective secondary winding as discussed herein.

In one example, the calculated time duration cTDEMAG[N+1] can be calculated as a particular time duration value. Instead of the controller 140 controlling the activation of the switch Q2 between the time T31 and time T35 for the full duration of the calculated time duration value, the controller 140 can be configured to reduce this magnitude as specified by the particular time duration value to ensure that the switch Q2 is not in the on state when a magnitude of the voltage VDS is greater than zero to provide some safety margin. An example of this is shown in FIG. 6. For example, the controller 140 activates the active switch Q2 between time T32 and time T34 instead of between time T32 and time T35. Thus, the controller 140 as discussed herein can be configured to calculate the fourth time duration based on reducing a magnitude of an original calculated time duration value. An example of controlling the switch Q2 to an on state for the full duration between time T31 and time T35 is shown in FIG. 5.

In the above example, if the control cycle N is a first control cycle of operating the power supply 100, the controller 140 controls the switch Q2 to an OFF-state during the second time duration between time T11 and time T15. The control cycle N is a first cycle of the multiple control cycles. As previously discussed, the switch Q2 may be a field effect transistor including one or more anti-parallel diodes (D2 and/or DS) disposed between a drain node (node N12) of the second switch Q2 and a source node (node N11) of the second switch Q2.

In one example, the control cycle N may be the first control cycle of the controller 140 controlling the switch Q2. In such an instance, the controller 140 has no other information to calculate a respective value for the second time duration. In one example, for the first control cycle N if it is the first control cycle, the controller 140 can be configured to not activate the corresponding switch Q2 and instead rely on the one or more antiparallel diodes associated the switch Q2 (such as the inherent diode associated with switch Q2 or the supplemental diode DS) support demagnetization of the transformer 130. The controller 140 can still measure this value of demagnetization for the second time duration and then use the second time duration on the subsequent cycle and N+1 to calculate the fourth time duration activate the switch Q2.

As discussed herein, the controller 140 can be configured to determine the first time duration, third time duration, etc., in which the switch Q1 is activated in the primary side in any suitable manner. In one example, the controller 140 determines the first time duration, third time duration, etc., via monitoring a voltage across a source node of the second switch and a drain node of the second switch Q2.

The controller 140 can be configured to receive input from the primary side indicating the corresponding time duration in which the switch Q1 is activated by the controller 144.

It is further noted that the controller 140 can be configured to first receive or measure the third time duration between time T29 and time T31 in order to calculate the fourth time duration of activating the respective switch Q2 between the time T31 and time T35. Accordingly, in one example, the controller 140 is operative to calculate the fourth time duration cTDEMAG[N+1] in which to control the ON-time of the second switch Q2 in the N+1 control cycle (such as between approximately time T31 and time T35) subsequent to expiration of the third time duration (time duration between time T29 and time T31) or simply after time T31.

It should also be noted that the controller 140 can be configured to measure a fifth time duration in the second control cycle N+1. The fifth time duration mTDEMAG[N+1], which represents a measured time duration indicating an actual measured amount of time required to demagnetize the transformer subsequent to activation of the first switch Q1 for the third time duration (such as between time T29 and time T31) in the second control cycle N+1. Note that the activation of the second switch Q2 for the fourth time duration cTDEMAG[N+1] in the second control cycle N+1 may only partially (by a less than all amount) demagnetize the transformer 130 and corresponding windings during the fifth time duration mTDEMAG[N+1]. Note further that flow of the secondary current (such as output current 122) through one or more of the anti-parallel diodes D2 and/or DS associated with the second switch Q2 at least partially demagnetizes the transformer 130 during the fifth time duration.

Figure 4:
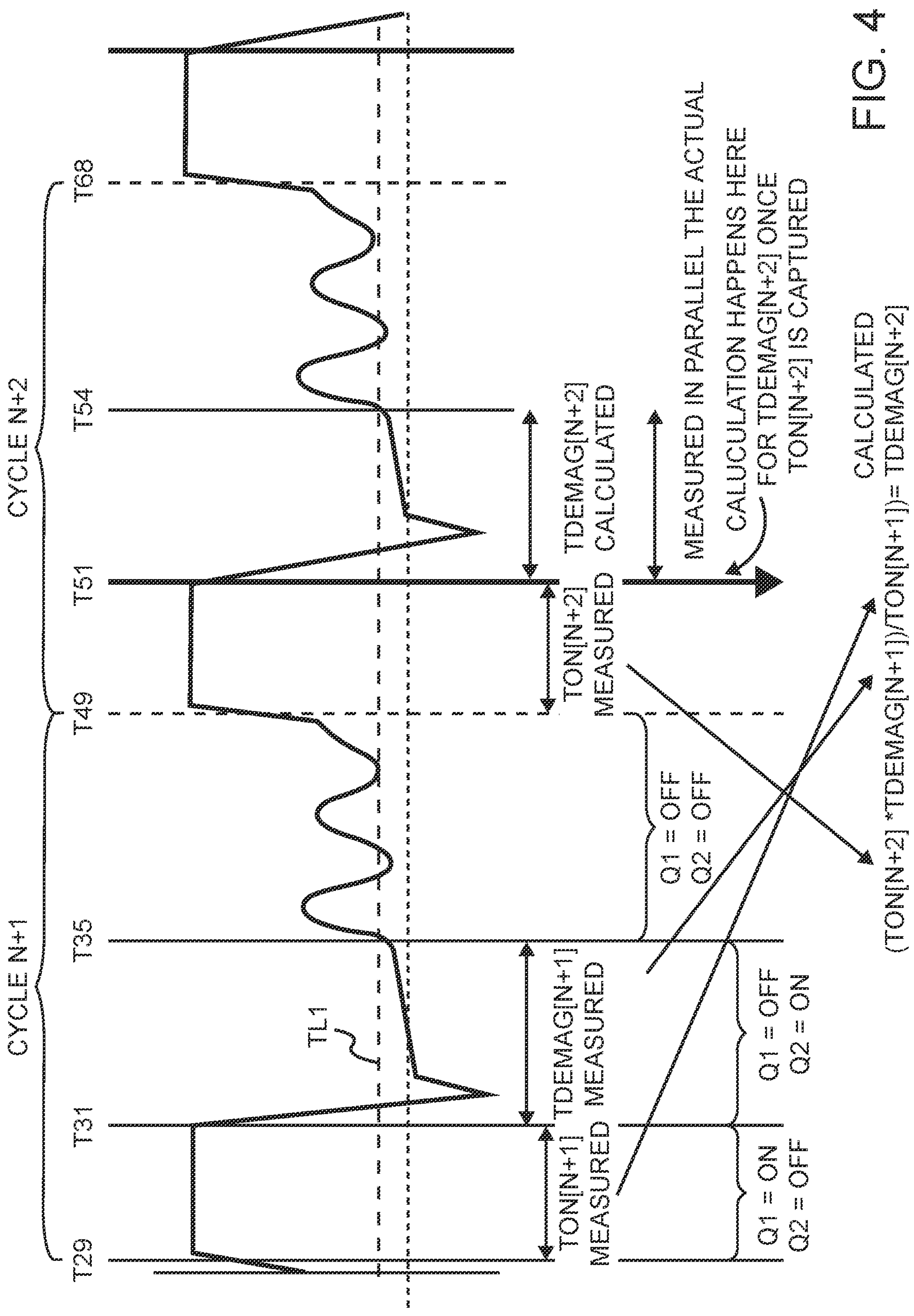
FIG. 4 is a timing diagram illustrating control of a respective SR switch to support demagnetization of a respective secondary winding as discussed herein.

FIG. 4 is an example diagram illustrating repeated measurement time durations and using a corresponding ratio value to determine how long to activate second switch.

FIG. 5 is a timing diagram illustrating control of a respective SR switch to support demagnetization of a respective secondary winding as discussed herein.

In this example, the controller 140 generates the respective control signal 106 such that the switch Q2 is activated to an ON-state between time T31 or T32 and time T35. Note that the time duration between time T31 and time T32 may be a dead time at which both switches Q1 and Q2 are temporarily in an off state. For example, after determining the calculated time duration mTDEMAG[N+1] such as between time T31 and time T35 (or time duration between time T32 and time T35), the controller 140 generates the control signal 106 to activate the switch Q2 between time T32 and time T35. In such an instance, this means that the switch Q2 is in the ON-state up until the transition of the monitored voltage VDS crossing the threshold value of 0 volts.

FIG. 6 is a timing diagram illustrating control of a respective SR switch to support demagnetization of a respective secondary winding as discussed herein.

In this example, the controller 140 generates the respective control signal 106 such that the switch Q2 is activated to an ON-state between time T32 and time T34 instead of activating the switch Q2 up until the time T35. For example, after determining the calculated time duration TDEMAG [N+1] such as between time T31 and time T35, the controller 140 calculates the on time value TON as calculated time duration cTDEMAG[N+1]−X1. The value X1 is any suitable amount of margin. This reduction in ON-time (time duration X1) of switch Q2 ensures that the switch Q2 is not accidentally activated when the magnitude of the voltage VDS is greater than 0 as shown in FIG. 6. Accordingly, the controller 140 generates the control signal 106 to activate the switch Q2 between time T32 and time T34. In such an instance, this means that the switch Q2 is not in the ON-state up until or after the transition of the monitored voltage VDS crossing (being greater than) the threshold value of 0 volts. In other words, reduction of the on time to TON between time T32 and time T34 ensures that the switch Q2 is prevented from being in an on state after the current Ids is greater than 0 as shown in FIG. 6.

Figure 7:
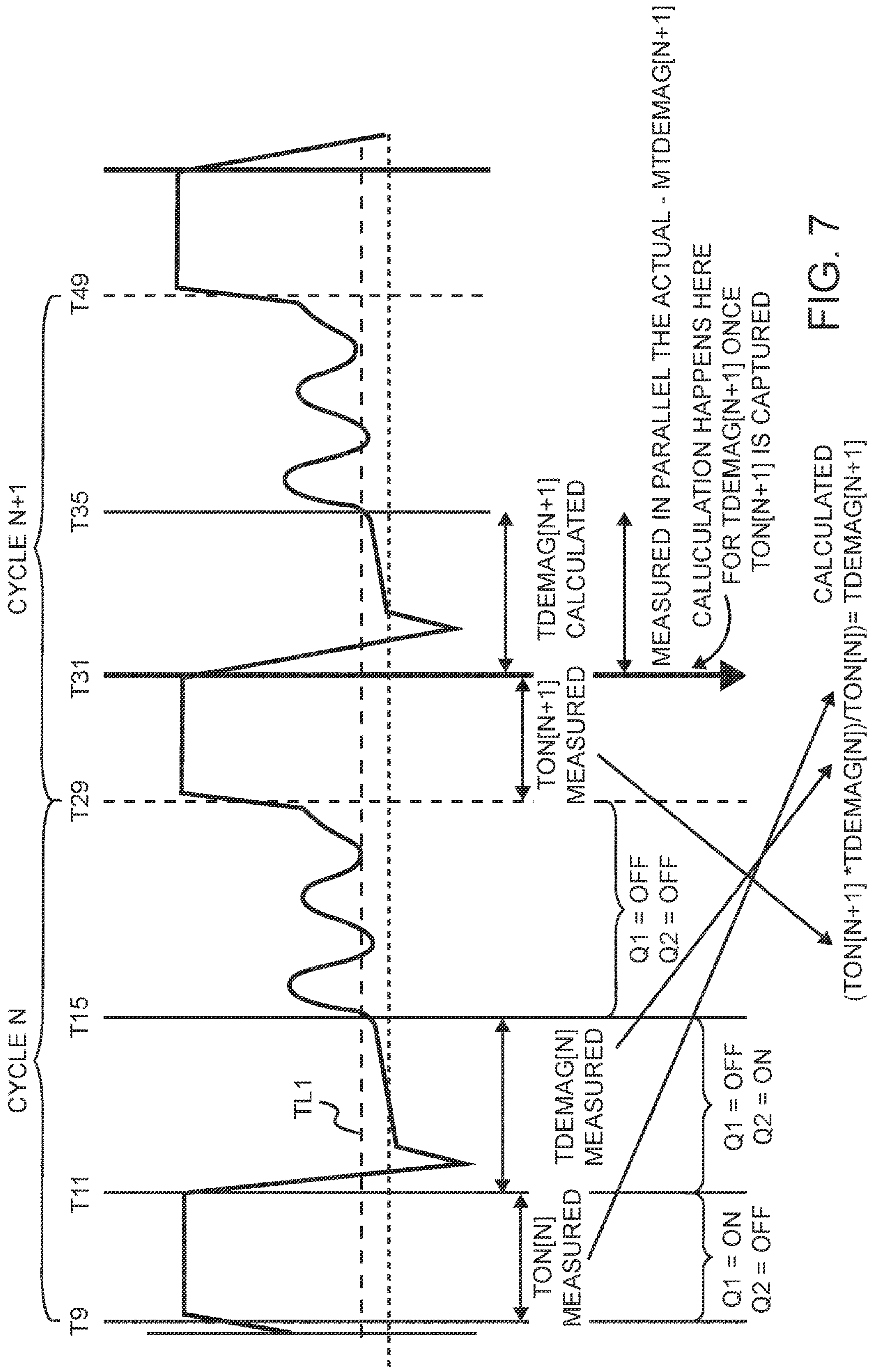
FIG. 7 is an example diagram illustrating use of ratio values to control time durations of controlling a respective SR switch as discussed herein.

FIG. 7 is an example diagram illustrating control of a respective SR switch to support demagnetization of respective secondary winding as discussed herein.

In this example, in a similar manner as previously discussed, the controller 140 determines one or more ratio values based on times of activating the switch Q1 in multiple different control cycles and uses such information as a basis in which to control a time of activating respective second switch Q2. As discussed herein, for a second control cycle following a first control cycle, it is desirable to activate the respective second switch Q2 for a proportional amount of time that the first switch Q1 is activated in the second control cycle.

As further discussed herein, the one or more ratio values may be used as a basis in which to control an on-time of the second switch.

More specifically, in one example, the controller 140 determines a first ratio value (RV1) defined as a ratio of a measured third time duration TON[N+1] (such as an amount of time that the switch Q1 is detected as being activated as determined via measuring the time between time T29 and time T31 in a second control cycle N+1) with respect to a first time duration TON[N] (such as an amount of time that the switch Q1 is detected as being activated as determined via measuring the time between time T9 and time T11 in a first control cycle N).

As previously discussed, activation of the first switch Q1 is operative to control a magnitude of primary current 221 through the primary winding 131 of the transformer 130.

$$RV1=TON[N+1]/TON[N]$$

For the second control cycle N+1 occurring subsequent to the first control cycle N, the controller 140 calculates an ON-time duration cTdemag[N+1] for activating the second switch Q2 such as between time T31 and time T35 based on the determined first ratio value RV1 multiplied by the measured on-time duration Tdemag[N] associated with activation of the second switch in the first cycle N (such as the actual measured time between time T11 and time T15 required to demagnetize the secondary winding 132 in the first control cycle N).

Accordingly, techniques herein include the controller 140 measuring an ON-time duration (between time T11 and time T15) of activating the second switch Q2 in the first control cycle N. As previously discussed, the second switch Q2 is coupled to receive current from a secondary winding 132 of the transformer. The secondary winding 132 is magnetically coupled to the primary winding 131. The controller 140 calculates the ON-time duration cTdemag[N+1] for activating the second switch Q2 for the second control cycle N+1 via generation of a time duration value TDV. For example, the controller 140 can be configured to generate the time duration value TDV (approximately the difference between the time T35 and the time T31) via multiplying the measured ON-time duration TDEMAG[N] of activating the second switch Q2 in the first control cycle N by the determined first ratio value RV1. For example, assume that $$TDV=cTDEMAG[N+1]=RV1*TDEMAG[N],$$

where RV1=TON[N+1]/TON[N]

The controller 140 can be configured to control activation of the switch Q2 for the amount of time as specified by TDV, resulting in activation of the switch between roughly time T31 and time T35.

As previously discussed, the controller 140 can be configured to reduce the amount time as specified by TDV by a predetermined time duration value to provide a safety margin to be sure that the switch Q2 is not activated at a time when the magnitude of the voltage VDS is greater than 0. In other words, reduction of the calculated time duration as specified by TDV by the predetermined time duration ensures that the calculated ON-time duration for activating the second switch Q2 in the second control cycle N+1 is less than a time to demagnetize the transformer 131 in the second control cycle N+1 subsequent to deactivation of the first switch Q2 at around time T31 in the second control cycle N+1. In such an instance, activation of the second switch Q2 in the second control cycle N+1 such as between time T31 and time T34 (such as prior to time T35) contributes to preventing the magnitude of current through the secondary winding from rising above a threshold level.

In accordance with further examples, in addition to activating the respective switch Q2 for the calculated time duration TDV, the controller 140 can be configured to further measure a third time duration between time T31 and time T35 in the second control cycle (N+1), the third time duration indicating an actual amount of time that was required to demagnetize the transformer subsequent to deactivation of the first switch Q2 in the second control cycle N+1. In other words, as previously discussed, the switch Q2 is not necessarily activated for the full duration of time needed to demagnetize the transformer 131 and corresponding secondary winding 132. The presence of the anti-parallel diode D2 and/or inherent diode of the switch Q2 may support some amount of demagnetization (such as between time T34 and time T35 as shown in FIG. 6) of the transformer 131 and corresponding secondary winding 132 when the switch Q2 has been deactivated in the time duration between time T31 and time T35.

Figure 8:
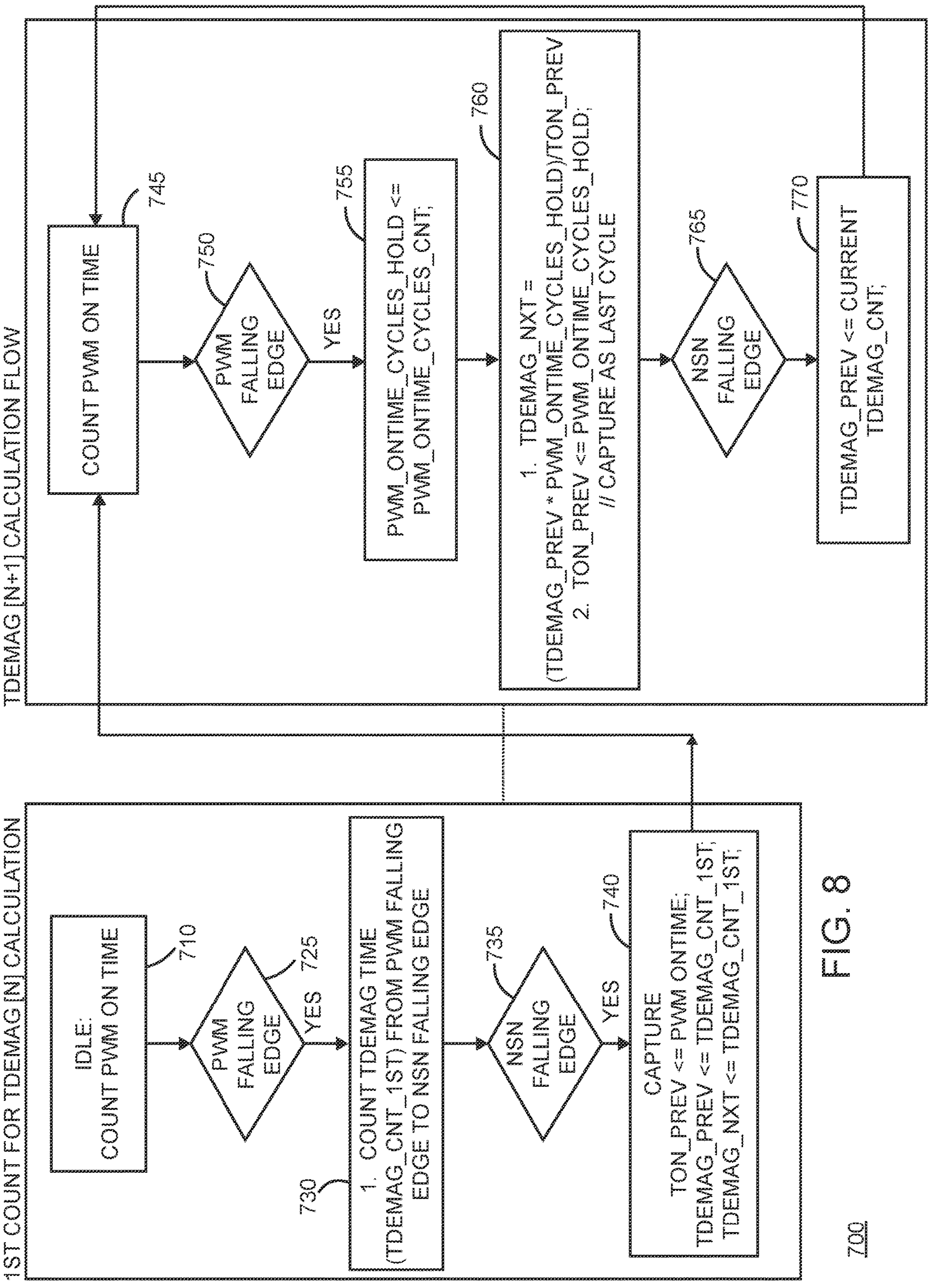
FIG. 8 is an example flow chart illustrating implementation of a respective method to control operation of an SR switch to demagnetize a transformer as discussed herein.

FIG. 8 is an example flow chart illustrating implementation of a respective method to control operation of an SR switch to demagnetize a transformer as discussed herein.

As shown in the flowchart 700, the controller 140 initially operates in the idle mode of counting PWM on time of controlling switch Q1 and switch Q2. In general, operations 710 through 740 represent operations for a first count for the TDEMAG[N] calculation.

More specifically, in processing operation 710, the controller 140 counts the PWM ON-time.

In processing operation 725, the controller 140 monitors for the occurrence of the falling edge associated with the PWM signal (105) associated with the switch Q1.

In processing operation 730, the controller 140 measures the corresponding TDEMAG time between the PWM falling edge and the NSN falling edge associated with switch Q2.

In processing operation 735, the controller detects the corresponding NSN falling edge.

In processing operation 740, the controller 140 captures information for storage such as ton_prev=pwm_ontime; TDEMAG_prev=tdemag_cnt_1$^{st}$; TDEMAG_next=tdemag_cnt_1$^{st}$.

In general, operations 745 to 770 represent operations for a next cycle count for the TDEMAG[N+1] calculation.

In processing operation 745, the controller 140 counts the PWM ON-time.

In processing operation 750, the controller 140 monitors for the occurrence of the falling edge associated with the PWM signal associated with the switch Q1.

In processing operation 755, the controller 140 sets the value pwm_ontime_cycles_hold to the value pwm_ontime_cycles_cnt.

In processing operation 760, the controller 140 sets values as follows:

tdemag_next=(tdemag_prev*pwm_ontime_cycles_hold)/ton_prev ton_prev=pwm_ontime_cycles_hold);//capture as last cycle/ton_prev In processing operation 765, the controller detects the corresponding NSN falling edge.

In processing operation 770, the controller 140 captures information storage such as TDEMAG_prev=current tdemag_cnt.

Figure 9:
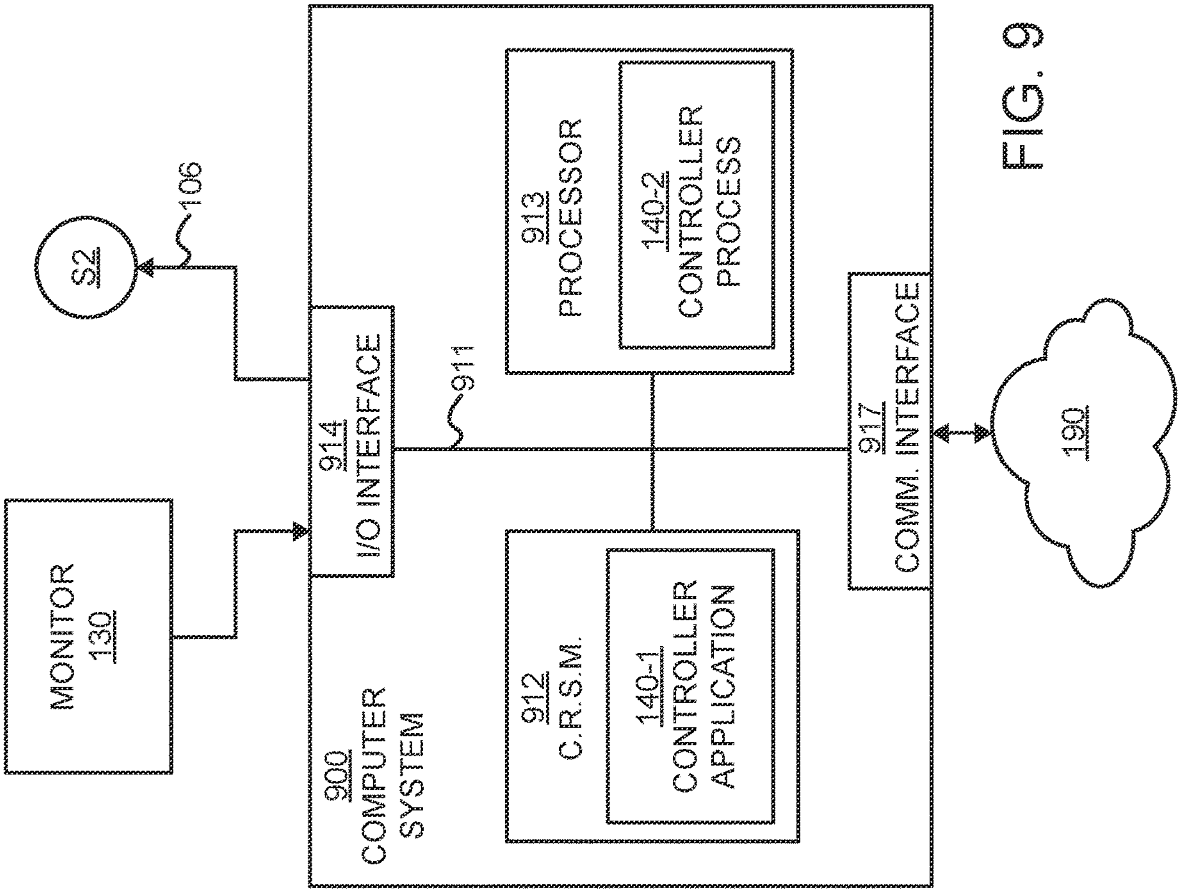
FIG. 9 is an example diagram illustrating computer architecture operable to execute one or more operations according to examples herein.

FIG. 9 is an example block diagram of a computer system for implementing any of the operations as previously discussed according to examples herein.

Any of the resources (such as controller 140, monitor 130, etc.) as discussed herein can be configured to include computer processor hardware and/or corresponding executable instructions to carry out the different operations as discussed herein.

For example, as shown, computer system 950 of the present example includes an interconnect 911 that couples computer readable storage media 912 such as a non-transitory type of media (which can be any suitable type of hardware storage medium in which digital information can be stored and retrieved), a processor 913 (computer processor hardware), I/O interface 914, and a communications interface 917.

I/O interface(s) 914 supports connectivity to voltage converter 110.

Computer readable storage medium 912 can be any hardware storage device such as memory, optical storage, hard drive, floppy disk, etc. In one example, the computer readable storage medium 912 stores instructions and/or data.

As shown, computer readable storage media 912 can be encoded with controller application 140-1 (e.g., including instructions) to carry out any of the operations as discussed herein.

During operation of one example, processor 913 accesses computer readable storage media 912 via the use of interconnect 911 in order to launch, run, execute, interpret or otherwise perform the instructions in controller application 140-1 stored on computer readable storage medium 912. Execution of the controller application 140-1 produces controller process 140-2 to carry out any of the operations and/or processes as discussed herein.

Those skilled in the art will understand that the computer system 950 can include other processes and/or software and hardware components, such as an operating system that controls allocation and use of hardware resources to execute controller application 140-1.

In accordance with different examples, note that computer system may reside in any of various types of devices, including, but not limited to, a power supply, switched-capacitor converter, power converter, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 950 may reside at any location or can be included in any suitable resource in any network environment to implement functionality as discussed herein.

Functionality supported by the different resources will now be discussed via flowchart in FIG. 10. Note that the steps in the flowchart below can be executed in any suitable order.

Figure 10:
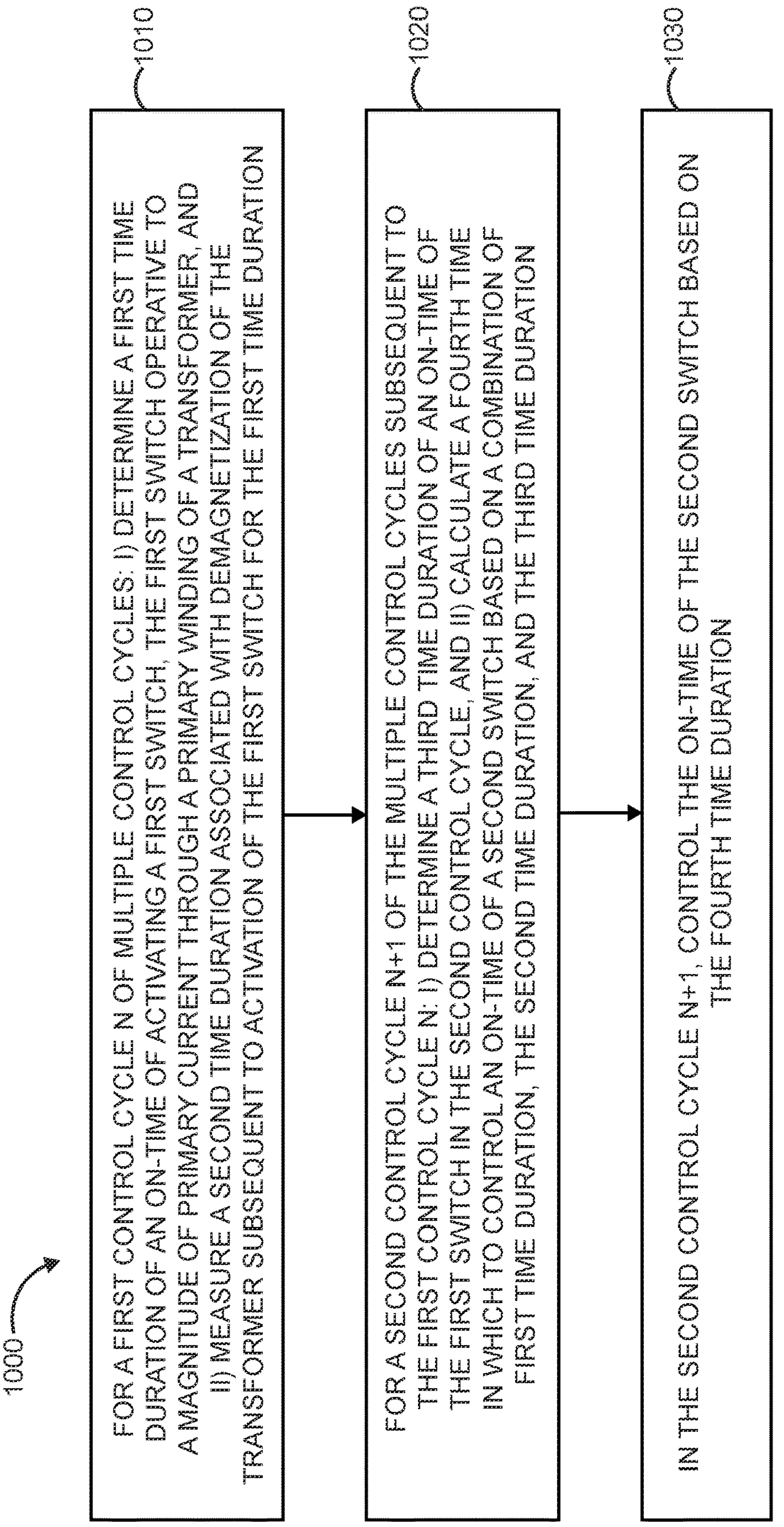
FIG. 10 is an example diagram illustrating a method according to examples herein.

FIG. 10 is a flowchart 1000 illustrating an example method according to examples herein. Note that there will be some overlap with respect to concepts as discussed above.

In processing operation 1010, for a control cycle N+1 of multiple control cycles: i) the controller 140 determines a first time duration (such as between time T29 and time T31) of an on-time of activating a first switch Q1, the first switch Q1 is operative to control a magnitude of primary current through a primary winding 131 of a transformer, and ii) the controller 140 measures a second time duration (such as between time T31 and time T35) associated with demagnetization of the transformer subsequent to activation of the first switch for the first time duration.

In processing operation 1020, for a control cycle N+2 of the multiple control cycles subsequent to the control cycle N+1: i) the controller 140 determines a third time duration of an on-time of activating the first switch Q2 in the control cycle N+2, and ii) the controller 140 calculates a fourth time duration (such as approximately between time T51 and time T54) in which to control an on-time of a second switch Q2 based on a combination of the first time duration, the second time duration, and the third time duration.

In processing operation 1030, in the control cycle N+2, the controller 140 controls the on-time of the second switch based on the fourth time duration (such as approximately between time T51 and time T54).

Figure 11:
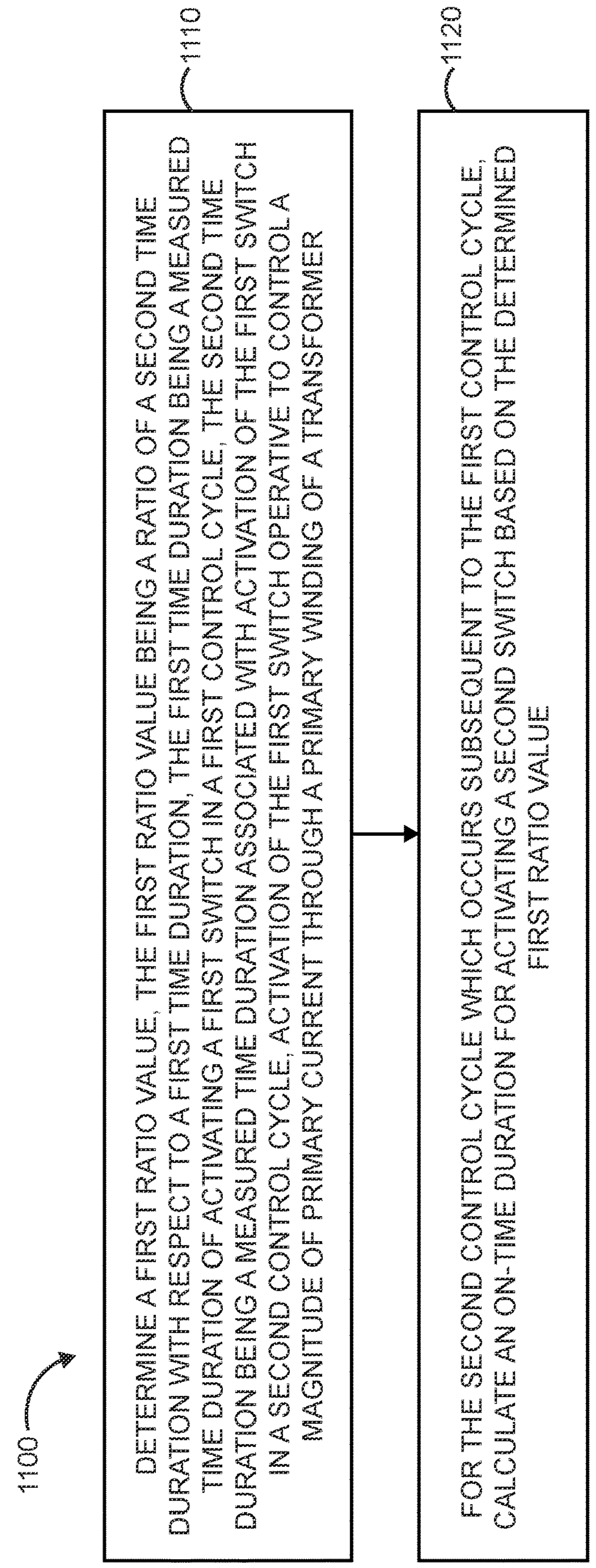
FIG. 11 is an example diagram illustrating a method according to examples herein.

FIG. 11 is a flowchart 1100 illustrating an example method according to examples herein. Note that there will be some overlap with respect to concepts as discussed above.

With reference to both FIG. 7 and FIG. 11, in processing operation 1110, the controller 140 determines a ratio value RV, the ratio value being a ratio of a third time duration such as between (time T29 and time T31) with respect to a first time duration (between time T9 and time T11), the second time duration (such as between time T11 and time T15) being a measured time duration associated with demagnetizing of a transformer in a control cycle N. The first time duration (such as between time T9 and time T11) is a measured time duration of activating a first switch in the control cycle N, activation of the first switch Q2 is operative to control a magnitude of primary current 221 through a primary winding 131 of the transformer.

In processing operation 1120, for a control cycle N+1 occurring subsequent to the control cycle N, the controller 140 calculates an on-time duration for activating the second switch Q2 based on the determined first ratio value RV. For example, the calculated on time duration to activate switch Q2 for a fourth time duration (such as between time T31 and time T35) is determined by multiplying the value RV by the second time duration (such as measured time duration between T11 and time T15).

Figure 12:
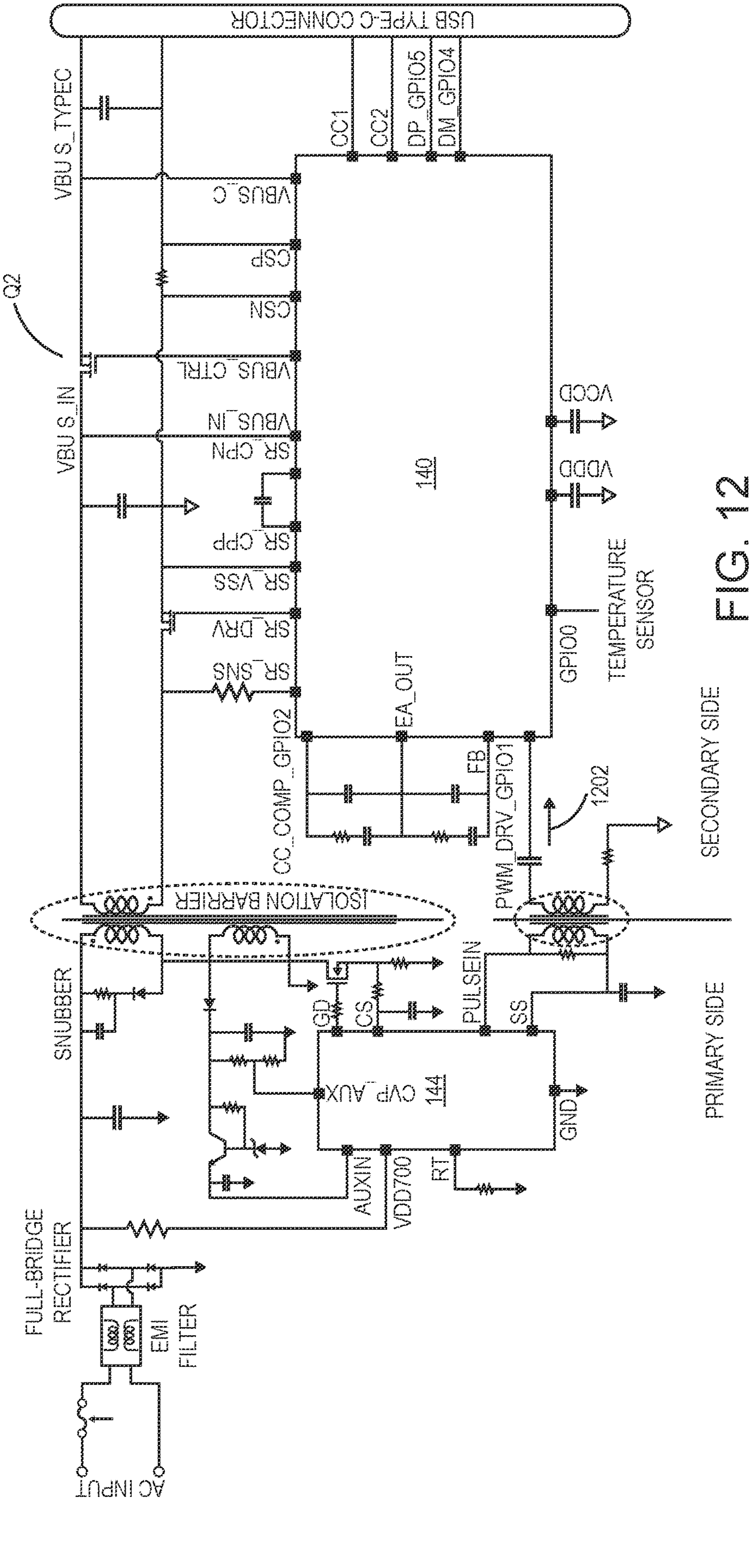
FIG. 12 is an example diagram illustrating reception of a signal from an auxiliary winding to determine on time of a respective one or more switches as discussed herein.

FIG. 12 is an example diagram illustrating reception of a signal from an auxiliary winding to determine on time of a respective switch as discussed herein.

In this example, the signal 1202 indicates the time associated with the activation of switch Q1.

Figure 13:
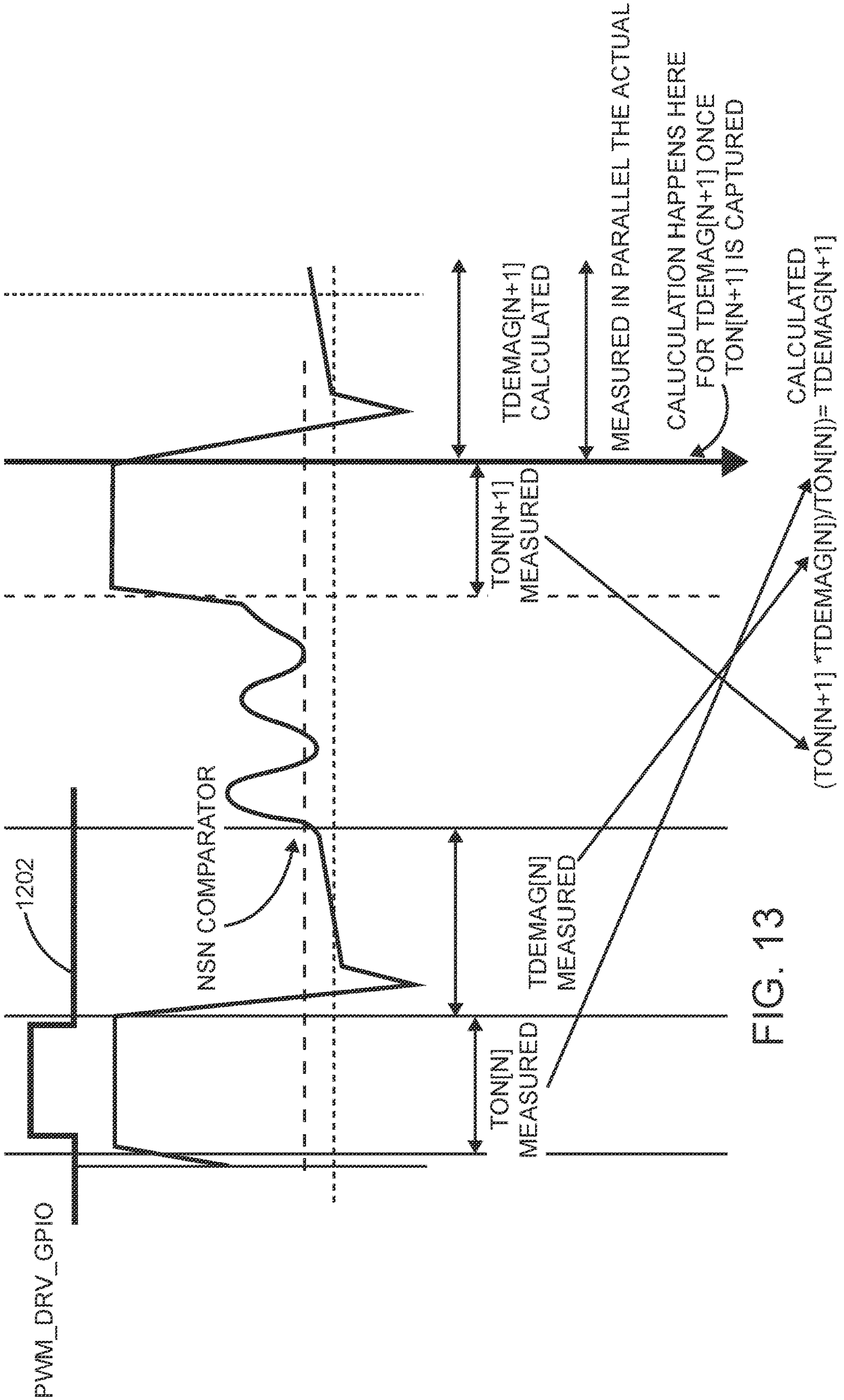
FIG. 13 is an example diagram illustrating timing diagram including the signal from a winding as discussed herein.

FIG. 13 is an example diagram illustrating timing diagram including the signal from a winding as discussed herein.

In this example, the controller 140 uses the signal 1202 to determine a time of activating the respective switch Q1.

Figure 14:
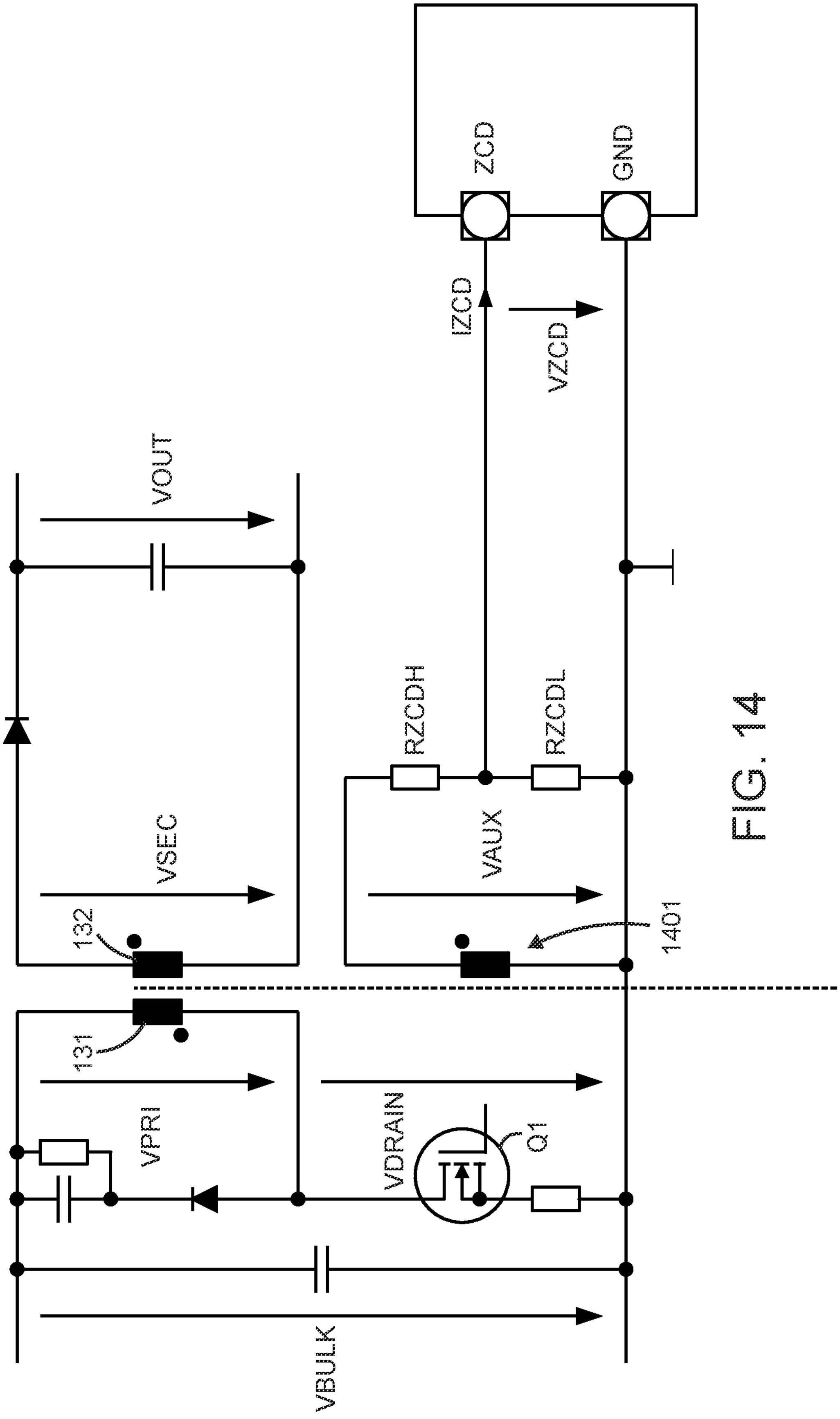
FIG. 14 is an example diagram illustrating implementation of an auxiliary winding in a power supply to monitor on time of one or more switches is discussed herein.

FIG. 14 is an example diagram illustrating implementation of an auxiliary winding in a power supply to monitor on time of one or more switches is discussed herein.

In this example, the power supply 100 includes the auxiliary winding 1401 magnetically coupled to the primary winding 131 of the secondary winding 132. The controller 140 can be configured to monitor a respective magnitude of the signal Vaux.

Figure 15:
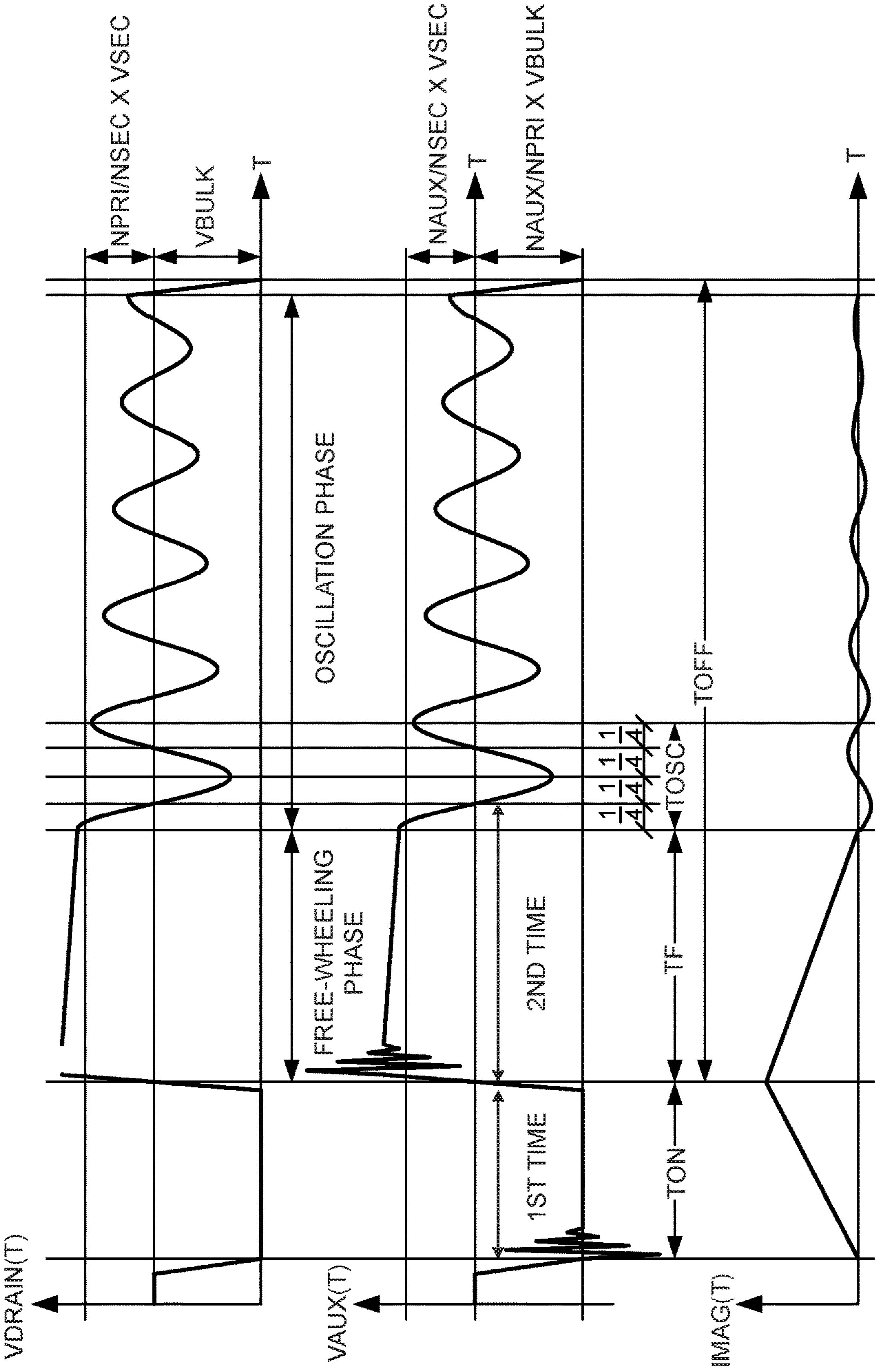
FIG. 15 is an example timing diagram illustrating how to monitor a signal from the auxiliary winding in FIG. 14 to monitor on time of one or more switches as discussed herein.

FIG. 15 is an example timing diagram illustrating how to monitor a signal from the auxiliary winding in FIG. 14 to monitor on time of one or more switches as discussed herein.

As shown in FIG. 15, the controller 140 uses the signal Vaux as a basis in which to determine an on time ($1^{st}$ time) of the respective switch Q1.

Note again that techniques herein are well suited for use in power supply applications. However, it should be noted that examples herein are not limited to use in such applications and that the techniques discussed herein are well suited for other applications as well.

While this invention has been particularly shown and described with references to preferred examples thereof, it will be understood by those skilled in the art that various changes in form and details may be made therein without departing from the spirit and scope of the present application as defined by the appended claims. Such variations are intended to be covered by the scope of this present application. As such, the foregoing description of examples of the present application is not intended to be limiting. Rather, any limitations to the invention are presented in the following claims.

The invention claimed is:

1. An apparatus comprising:

a controller operative to:

for a first control cycle N of multiple control cycles: i) determine a first time duration of an ON-time of activating a first switch, the first switch operative to control a magnitude of primary current through a primary winding of a transformer, and ii) measure a second time duration associated with demagnetization of the transformer subsequent to activation of the first switch for the first time duration;

for a second control cycle N+1 of the multiple control cycles subsequent to the first control cycle N: i) determine a third time duration of an ON-time of activating the first switch in the second control cycle, and ii) calculate a fourth time duration in which to control an ON-time of a second switch based on a combination of the first time duration, the second time duration, and the third time duration; and in the second control cycle N+1, control the ON-time of the second switch based on the fourth time duration.

2. The apparatus as in claim 1, wherein the controller is further operative to calculate the fourth time duration based on a time duration value, the time duration value derived via: i) a ratio of the third time duration with respect to the first time duration, and ii) multiplication of the ratio and the second time duration.

3. The apparatus as in claim 2, wherein the controller is further operative to calculate the fourth time duration based on reducing a magnitude of the time duration value.

4. The apparatus as in claim 1, wherein the second switch is operative to control a flow of secondary current through a secondary winding of the transformer, the secondary winding magnetically coupled to the primary winding.

5. The apparatus as in claim 1, wherein the second switch is set to an OFF-state during the second time duration;

wherein the second switch is a field effect transistor including an anti-parallel diode disposed between a drain node of the second switch and a source node of the second switch; and wherein secondary current flows through the anti-parallel diode during the first control cycle N to demagnetize the transformer.

6. The apparatus as in claim 1, wherein the controller is operative to determine the first time duration via monitoring a voltage across a source node of the second switch and a drain node of the second switch.

7. The apparatus as in claim 1, wherein the controller is operative to measure the second time duration via monitoring a voltage across a source node of the second switch and a drain node of the second switch.

8. The apparatus as in claim 1, wherein the controller is operative to calculate the fourth time duration in which to control the ON-time of the second switch in the second control cycle N+1 subsequent to expiration of the third time duration.

9. The apparatus as in claim 1, wherein the controller is operative to measure a fifth time duration in the second control cycle N+1, the fifth time duration indicating an amount of time required to demagnetize the transformer subsequent to activation of the first switch for the third time duration in the second control cycle N+1.

10. The apparatus as in claim 9, wherein activation of the second switch for the fourth time duration in the second control cycle N+1 partially demagnetizes the transformer during the fifth time duration; and wherein flow of the secondary current through an anti-parallel diode in the second switch at least partially demagnetizes the transformer during the fifth time duration.

11. The apparatus as in claim 1, wherein the second time duration is measured via monitoring a magnitude of secondary current through a secondary winding of the transformer, the secondary winding magnetically coupled to the primary winding; and wherein the magnitude of the secondary current is monitored via a voltage across the second switch.

12. The apparatus as in claim 1, wherein an ON-time activation of the second switch in the second duration of the first control cycle N and on-time activation of the second switch in the fourth duration of the second control cycle N+1 is operative to control secondary current through a secondary winding of the transformer, the secondary winding magnetically coupled to the primary winding, the ON-time activation of the second switch operative to demagnetize the transformer.

13. An apparatus comprising:

a controller operative to:

determine a first ratio value, the first ratio value being a ratio of a second time duration with respect to a first time duration, the first time duration being a measured time duration of activating a first switch in a first control cycle, the second time duration being a measured time duration associated with activation of the first switch in a second control cycle, the activation of the first switch operative to control a magnitude of primary current through a primary winding of a transformer;

for the second control cycle which occurs subsequent to the first control cycle, calculate an ON-time duration for activating a second switch based on the determined first ratio value; and wherein the controller is further operative to: activate the second switch in the second control cycle based on the calculated ON-time duration, the second switch coupled to receive current from a secondary winding of the transformer, the secondary winding magnetically coupled to the primary winding, wherein the activation of the second switch in the second control cycle prevents the magnitude of secondary current through the secondary winding from rising above a threshold level.

14. The apparatus as in claim 13, wherein the controller is further operative to:

measure an ON-time duration of activating the second switch in the first control cycle, the second switch coupled to receive the secondary current from the secondary winding of the transformer; and calculate the ON-time duration for activating the second switch for the second control cycle via generation of a time duration value, the time duration value generated via multiplying the measured ON-time duration of activating the second switch in the first control cycle by the determined first ratio value.

15. The apparatus as in claim 13, wherein the controller is further operative to calculate the ON-time duration for activating the second switch in the second control cycle by reducing the calculated ON-time duration by a predetermined time duration.

16. The apparatus as in claim 15, wherein the reduction of the calculated ON-time duration by the predetermined time duration ensures that the calculated ON-time duration for activating the second switch in the second control cycle is less than a time to demagnetize the transformer in the second control cycle subsequent to deactivation of the first switch in the second control cycle.

17. The apparatus as in claim 13, wherein the controller is further operative to:

measure a third time duration in the second control cycle, the third time duration indicating an amount of time that was required to demagnetize the transformer subsequent to deactivation of the first switch in the second control cycle; and wherein the measured third time duration is at least partially concurrent with activation of the second switch for the calculated ON-time duration in the second control cycle.

18. The apparatus as in claim 13, wherein the second switch is operative to control a flow of the secondary current through the secondary winding.

19. The apparatus as in claim 13, wherein the second switch is set to an OFF-state during the second time duration;

wherein the second switch is a field effect transistor including an anti-parallel diode disposed between a drain node of the second switch and a source node of the second switch; and wherein the current flows through the anti-parallel diode during the first control cycle to demagnetize the transformer.

20. The apparatus as in claim 13, wherein the controller is operative to determine the first time duration via monitoring a voltage across a source node of the second switch and a drain node of the second switch.

21. The apparatus as in claim 13, wherein the controller is operative to measure the second time duration via monitoring a voltage across a source node of the second switch and a drain node of the second switch.

22. The apparatus as in claim 13, wherein the controller is operative to activate the second switch in the second control cycle in response to deactivation of the first switch in the second control cycle.

23. A method comprising:

determining a first ratio value, the first ratio value being a ratio of a second time duration with respect to a first time duration, the first time duration being a measured time duration of activating a first switch in a first control cycle, the second time duration being a measured time duration associated with activation of the first switch in a second control cycle, activation of the first switch operative to control a magnitude of primary current through a primary winding of a transformer;

for the second control cycle occurring subsequent to the first control cycle, calculating an ON-time duration for activating a second switch based on the determined first ratio value; and wherein calculating the ON-time duration for activating the second switch for the second control cycle includes: generating a time duration value via multiplying the measured ON-time duration of activating the second switch in the first control cycle by the determined first ratio value.

* * * * *